United States Patent
Blair

[15] 3,663,270
[45] May 16, 1972

[54] BRAZING STOP-OFF TREATMENT OF PERFORATED METAL SHEETS

[72] Inventor: Winford Blair, La Mesa, Calif.
[73] Assignee: Rohr Corporation, Chula Vista, Calif.
[22] Filed: Apr. 20, 1970
[21] Appl. No.: 30,014

[52] U.S. Cl..........................117/98, 29/455 LM, 117/104 R, 117/119, 117/127, 118/DIG. 7, 101/68, 161/109
[51] Int. Cl. .........................................B44d 1/08, B44d 1/02
[58] Field of Search......................117/98, 104 R, 105.1, 127, 117/119; 118/DIG. 7; 161/68, 109; 29/455 LM

[56] References Cited

UNITED STATES PATENTS 3,294,576  12/1966  Geraghty..................................117/98
2,962,384  11/1960  Ljungbo................................117/98 X Primary Examiner—Edward G. Whitby
Attorney—George E. Pearson

[57] ABSTRACT

A thin, perforated, metal sheet, one side of which is to be brazed to another element, has the other side thereof treated to prevent braze alloy from flowing into and through the perforations by spraying said other side of the sheet with a non-runny or thixotropic braze stop-off compound while at the same time maintaining a gentle flow of air or other gas through the perforations in the sheet in the direction of spray flow so as to carry away particles of spray material which pass through the perforations and thereby prevent such spray particles from contaminating the brazing side of the sheet.

5 Claims, 3 Drawing Figures

PATENTED MAY 16 1972  3,663,270

INVENTOR.
WINFORD BLAIR
BY
George E. Pearson
ATTORNEY

BRAZING STOP-OFF TREATMENT OF PERFORATED METAL SHEETS

BACKGROUND OF THE INVENTION

In making acoustical honeycomb panels a thin, perforated metal facing sheet is attached either by bonding or brazing to one or both ends of a honeycomb core. The present invention is used in the making of the brazed type of panel, wherein braze alloy is applied, as by spraying, brushing or in the form of a foil sheet, to one side of each panel facing sheet, one of which facing sheets is applied under suitable retaining pressure and atmospheric control to each end of the honeycomb core with the braze alloy between the facing sheet and the core. Upon heating the assembly of core and facing sheets to brazing temperature, the facing sheets are brazed to the core. However, during the brazing process the melted brazing alloy tends to flow into and through the perforations in the perforated facing sheets, sealing off some of the perforations to thereby reduce the acoustical effectiveness of the panel, and flowing through onto the outside of the panel to mar its appearance. As far as applicant is aware, no effective means have previously been known to prevent such flow-through of brazing alloy, since prior attempts to use stop-off compound have resulted in the stop-off compound flowing through onto the braze side of the sheet, thereby contaminating the braze surface and producing a defective braze.

SUMMARY OF THE INVENTION

It is a principal objective of the present invention to provide an effective and unflawed braze between a perforated facing sheet and a honeycomb core to make an acoustical panel without stoppage of the perforations in the sheet, or flow-through, by the braze alloy.

DESCRIPTION OF THE DRAWINGS

The foregoing objective and advantages of the invention will be apparent from the following description and the accompanying drawings, wherein.

DETAILED DESCRIPTION

Figure 3:
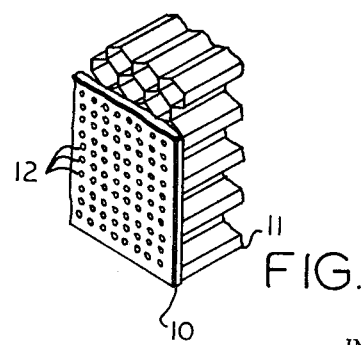
FIG. 3 is a further enlarged perspective view of a small fragment of perforated facing sheet applied to a honeycomb core, a portion of the facing sheet being broken away to expose the core.

In the illustrative embodiment of the invention a thin, perforated metal facing sheet 10 for use in facing one side of a honeycomb core 11, see FIG. 3, to provide an acoustical honeycomb panel, not shown, of well-known type is first thoroughly cleaned in a manner to prepare it for brazing. This cleaning treatment will vary depending upon various factors, such as the metal of which the facing sheet and core are made, i.e., stainless steel, aluminum, titanium, etc., and the braze alloy to be used. A suitable method for cleaning titanium facing sheets is disclosed in U.S. Pat. No. 3,468,774, assigned to the assignee of the present invention. Other suitable cleaning methods are well known.

Figure 1:
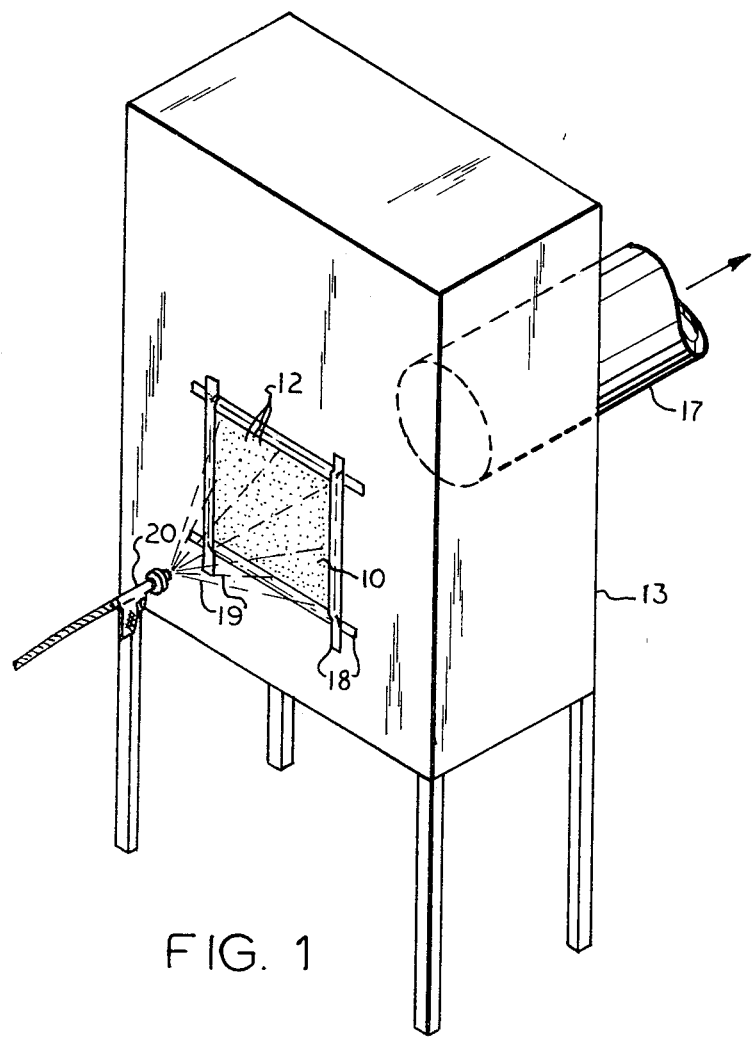
FIG. 1 is a somewhat diagrammatic view showing a set-up for providing a gentle flow of air through the perforations of a facing sheet, and a spray gun discharging a spray of stop-off material onto the non-brazing side of the sheet.
Figure 2:
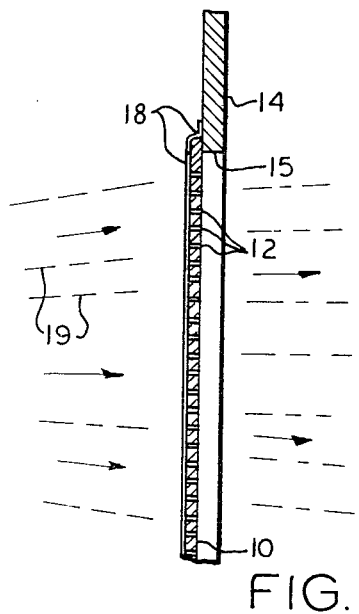
FIG. 2 is an enlarged, fragmentary, vertical, cross-sectional view through a marginal portion of the perforated facing sheet of FIG. 1 and includes a portion of the spray pattern from the spray gun.

The cleaned facing sheet 10 is set up so as to induce a gentle, preferably uniform flow of either clean air or other suitable gas through the perforations 12 in the sheet. Such gentle flow can be provided for in numerous ways which will readily occur to a competent spray painting artisan, technician or engineer. One suitable arrangement is shown in FIG. 1 of the drawings, wherein an otherwise sealed housing 13 encloses a suction chamber 14 having an opening 15 in a side thereof, see FIG. 2, of the size and shape of a selected perforated area of a facing sheet 10 to be treated. A suction line 17 communicates with the interior of the cabinet 13 for reducing pressures within the chamber 14. A facing sheet 10 to be treated is applied to the cabinet opening with the selected perforated area thereof exposed within the compartment opening 15, and the edges of the facing sheet 10 sealed to the cabinet as by adhesive tape strips 18.

By means of a suction pump or other means, not shown, applied to the suction line 17, pressure within the chamber 14 is reduced as required relative to the ambient atmospheric pressure on the external face of the facing sheet 10 to induce a gentle flow of air through the perforations 12 in the facing sheet into the chamber 14.

With the required amount of air, or such other gas as may be employed, flowing through the perforations 12 in the sheet 10, suitable braze stop-off compound of a non-runny or thixotropic consistency is then sprayed, in the form of a fine spray 19 by means of a suitable or conventional spray gun 20, onto the exposed outer face of the facing sheet 10. Preferably the spray gun 20 is of the airless type, wherein the spray pattern is generated by high pressure on the spray material itself, but an ordinary air or gas type gun may be used provided care is used to prevent undue increase in pressure on a facing sheet 10 being treated.

The flow of air or other suitable gas through the perforations 12 in the facing sheet 10 during spraying thus provided causes air or gas borne spray particles of stop-off compound which pass through the perforations 12 to be carried clear of the inner or brazing side of the sheet 10. However, sufficient amount of the spray material will impinge on and adhere to the edge portions of the sheet 10 defining the perforations 12 to coat these edge portions as well as the entire exposed outer side of the facing sheet 10 with the stop-off material without coating, or extending, or flowing to any portion of the inner or brazing side of the sheet 10.

The invention provides a simple, inexpensive and effective method of treating a perforated facing sheet to be used for facing one side of a honeycomb core in the making of a brazed acoustical honeycomb panel so as to prevent braze alloy from flowing into and through perforations in the facing sheet during a subsequent brazing operation.

Having illustrated and described the invention, I now claim, and desired to protect by Letters Patent of the United States of America:

1. The method of treating a perforated metal facing sheet for an acoustical panel preparatory to brazing said sheet to a panel core element, said sheet having a brazing and a non-brazing side, to prevent a flow of brazing alloy from the brazing side of the sheet into and through the perforations in such sheet to be non-brazing side during a brazing operation, which method comprises, arranging said perforated facing sheet with a selected, perforated area of the non-brazing side of such sheet exposed for spraying, inducing a gentle, and substantially uniform flow of a selected gas through the perforations in the selected area of such sheet from the non-brazing side to the brazing side of the sheet, and applying a spray coating of non-runny or thixotropic braze stop-off material to the non-brazing side of the sheet while maintaining such gas flow throughout substantially the entire period of such spray coating application.

2. The method of treating a perforated metal sheet preparatory to brazing as defined in claim 1 wherein the spray coating is applied by directing an airless type spray gun at such sheet.

3. The method of treating a perforated metal sheet preparatory to brazing as defined in claim 1 wherein a perforated sheet to be treated is attached in substantially air-tight relation to shielding means extending marginally beyond the sheet thereby to prevent air or gas borne spray particles from passing around the edges of the sheet and reaching the brazing side thereof.

4. The method of treating a perforated metal sheet preparatory to brazing as defined in claim 1 wherein the selected perforated area of the sheet is positioned in register with an opening in shielding member shaped to conform to the marginal portion of such perforated sheet laterally beyond such selected perforat area thereof, and applying sealing means to the marginal portion of such perforated sheet, thereby sealing the marginal portion of the sheet in air tight relation to the shielding member.

5. The method of treating a perforated metal sheet preparatory to brazing as defined in claim 1 wherein the selected, perforated area of the sheet is positioned in register with an opening provided therefor in a wall of a suction cabinet, and the edges of such sheet are sealed in air tight relation to the cabinet, the pressure within the cabinet being reduced relative to the ambient atmospheric pressure sufficiently to provide the required gentle, substantially uniform flow of air or gas through the perforations in the sheet during spraying.

* * * * *